(12) United States Patent
Yamanaka

(10) Patent No.: US 9,221,435 B2
(45) Date of Patent: Dec. 29, 2015

(54) PARKING BRAKE DEVICE AND METHOD OF MANUFACTURING THE SAME

(71) Applicant: HONDA MOTOR CO., LTD., Tokyo (JP)

(72) Inventor: Fumikage Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/177,249

(22) Filed: Feb. 11, 2014

(65) Prior Publication Data

US 2014/0224601 A1   Aug. 14, 2014

(30) Foreign Application Priority Data

Feb. 12, 2013 (JP) ................. 2013-024666

(51) Int. Cl.
| | |
|---|---|
| *B60T 7/08* | (2006.01) |
| *B60T 11/06* | (2006.01) |
| *B60T 7/10* | (2006.01) |
| *B60T 11/04* | (2006.01) |
| *F16D 66/00* | (2006.01) |
| *F16D 125/60* | (2012.01) |

(52) U.S. Cl.
CPC ................. *B60T 7/085* (2013.01); *B60T 7/104* (2013.01); *B60T 11/046* (2013.01); *B60T 11/06* (2013.01); *F16D 2066/005* (2013.01); *F16D 2125/60* (2013.01); *Y10T 29/49826* (2015.01)

(58) Field of Classification Search
CPC ....... B60T 7/085; B60T 11/046; B60T 11/06; B60T 7/104; F16D 2066/005; F16D 2125/60; Y10T 29/49826
See application file for complete search history.

(56) References Cited

U.S. PATENT DOCUMENTS

| | | | |
|---|---|---|---|
| 7,331,254 B2* | 2/2008 | Petrak | 74/502.4 |
| 7,331,255 B2* | 2/2008 | Petrak | 74/502.4 |
| 8,235,181 B2* | 8/2012 | Sano et al. | 188/2 D |
| 2009/0031868 A1* | 2/2009 | Petrak | 81/486 |
| 2010/0078273 A1* | 4/2010 | Kim | 188/156 |

FOREIGN PATENT DOCUMENTS

JP        60-81158 U      6/1985

\* cited by examiner

*Primary Examiner* — Vishal Sahni
(74) *Attorney, Agent, or Firm* — Westerman, Hattori, Daniels & Adrian, LLP

(57) ABSTRACT

There is provided a parking brake device including a link plate which is disposed on a bracket and relays movement of a parking brake lever to a brake cable, and a connection rod with one end being connected to the link plate and the other end being connected to the brake cable, an approximately center portion of the connection rod being provided with a columnar portion. The columnar portion is provided with mutually facing flat faces on which a tensile load detector is mounted such that a tensile load applied to the brake cable is detected by the tensile load detector.

7 Claims, 11 Drawing Sheets

EXTENDING DIRECTION OF PLANE IN PLANAR UNIT

PARKING BRAKE DEVICE AND METHOD OF MANUFACTURING THE SAME

CROSS REFERENCES TO RELATED APPLICATIONS

The present application claims priority under 35 U.S.C. §119 to Japanese Patent Application No. 2013-024666, filed Feb. 12, 2013, entitled "Parking Brake Device and Method of Manufacturing the Same." The contents of this application are incorporated herein by reference in their entirety.

TECHNICAL FIELD

The present disclosure relates to a parking brake device and a method of manufacturing the parking brake device in which raising or lowering an operating lever causes an operating force to be transmitted to a brake unit via a brake cable so as to generate braking power.

BACKGROUND

For example, Japanese Unexamined Utility Model Registration Application Publication No. 60-81158 discloses a parking brake lever travel inspection device which includes a detector to convert a pulling load and a pulling stroke of a parking brake into electrical signals.

In the parking brake lever travel inspection device, in order to adjust the tension of a brake cable, the detector is connected to the lever of the parking brake via a hook, and a pulling load and a pulling stroke are detected by pulling the detector toward an operator of the inspection device.

However, in the parking brake lever travel inspection device disclosed in Japanese Unexamined Utility Model Registration Application Publication No. 60-81158, an operator needs to pull the detector for detecting a pulling load with the detector being hooked to the lever of the parking brake.

In this case, members, for example, a ball and a notch are present between the lever of the parking brake and the brake cable, and thus even when the pulling load of the lever itself is detected, a problem arises in that the pulling load applied to the brake cable itself cannot be accurately detected.

SUMMARY

The present disclosure has been made in consideration of the above situation, and provides a parking brake device and a method of manufacturing the parking brake device which is capable of improving the accuracy in detecting the tensile load applied to the brake cable and adjusting the tensile load of the brake cable accurately.

One aspect of the present disclosure provides a parking brake device which has a bracket fixed to a vehicle body member and a operating lever rotatably supported on the bracket pivotally in which raising or lowering the operating lever causes an operating force of the operating lever to be transmitted individually to a plurality of wheel brakes as a braking operation force via an equalizer and a plurality of brake cables. The parking brake device includes a mounting portion on which a tensile load detection unit is mounted such that a tensile load applied to the brake cables is detected by the tensile load detection unit. The mounting portion is disposed between the equalizer and the bracket.

According to another aspect, by providing the mounting portion on which the tensile load detection unit is mounted, the accuracy in detecting the tensile load applied to the brake cables can be improved and the tensile load of the brake cables can be accurately adjusted. Moreover, by disposing the mounting portion on which the tensile load detection unit is mounted between the equalizer and the bracket, detection work of tensile load can be carried out with the parking brake device incorporated in the vehicle. For this reason, detection work of tensile load can be easily performed.

Preferably, in another aspect, the equalizer is provided at ends of the brake cables, and includes: the mounting portion having a screw portion and a columnar portion; a cable adjustment nut to be screwed onto the screw portion; a fitting pin having a through hole in which the screw portion is inserted; a retaining element configured to rotatably support the fitting pin. The mounting portion is a flat lateral face of the columnar portion.

According to this aspect, the mounting portion for mounting the tensile load detection unit can be provided on the columnar portion of the equalizer irrespective of the structure of the bracket and the operating lever, and thus general versatility can be improved.

Preferably, the present disclosure further includes a connection rod, the connection rod being disposed in the bracket, the connection rod having one end and the other end, the one end being connected to the operating lever or a relay member which relays movement of the operating lever to the brake cables, the other end being connected to the brake cables. The mounting portion is provided in the connection rod.

According to this aspect, the tensile load applied to the connection rod is suitably detected by providing the connection rod with the mounting portion on which the tensile load detection unit is mounted, the connection rod being directly connected to the brake cables. As a result, the accuracy in detecting the tensile load, which is applied to the brake cables, can be improved, and the tensile load of the brake cables can be adjusted accurately.

Preferably, in another aspect, the connection rod is provided in a cylindrical shape, one end of the connection rod includes a planar portion which is in sliding contact with the relay member or the operating lever, an approximately center portion of the connection rod is provided with a columnar portion, a cross section of the columnar portion perpendicular to an axial direction thereof is a polygon which has diagonal vertices located in an extending direction of a plane of the planar portion, and the mounting portion is a flat lateral face of the columnar portion.

In general, in order to detect a tensile load accurately, it is necessary to install the tensile load detection unit on a flat surface. For example, when a tensile load is detected with the connection rod clamped by the tensile load detection unit, at least two facing planes are necessary at the detection portion of the connection rod. When the two planes are formed in the connection rod, the cylindrical connection rod is pressure-molded by press work. However, when a pressing direction is set to be a different direction from the pressing direction of the press work for the planar portion, the press work being originally necessary for mounting to the relay member, the number of processing steps is increased and the manufacturing process becomes complicated. In order to form the planes by press work, it is necessary to consider that forming planes difficult because burrs occur on the mating portions of the press mold.

Thus, in this aspect, a cross section of the columnar portion perpendicular to its axial direction is a polygon which has diagonal vertices located in the extending direction of the plane of the planar portion, and thus the flat lateral faces as the mounting portion of the columnar portion can be molded simultaneously with the press work for providing the planar portion which is in sliding contact with the relay member. In addition, the mating portions of a press mold can include vertices of a cross section polygon, and thus the facing planes can be simply molded, and it is possible to provide the mounting portion (the flat lateral faces of the columnar portion) which allows the accuracy of detection of a tensile load to be improved, by easy processing.

Furthermore, the tensile load of the connection rod is usually detected with the parking brake device incorporated in the vehicle body, and the connection rod is surrounded by bracket and the vehicle body member (for example, vehicle body floor). Therefore, it is necessary to mount the tensile load detection unit on the mounting portion of the connection rod in a vehicle width direction.

Then, a cross section of the columnar portion perpendicular to its axial direction is a polygon which has diagonal vertices located in the extending direction of the plane of the planar portion, and so for example, in the case where the tensile load detection unit includes a clamping unit equipped with the strain gauge, the planes included in the mounting portion can be suitably set with an angle including a vehicle width direction component. If the flat faces included in the mounting portion are set in a vehicle vertical direction the clamping units of the tensile load detection unit need to be mounted in a vehicle vertical direction, and a problem arises in that the clamping units interfere with other members. According to one aspect, the above-mentioned increase in the number of processing steps and interference with other members may be avoided so that both advantages may be combined (achieved).

Preferably, in another aspect, the bracket includes a vertical wall which extends in a fore-and-aft direction of a vehicle and is configured to rotatably support the operating lever pivotally, a set of legs provided on the vertical wall in the fore-and-aft direction of the vehicle, and a set of fixed bearing surfaces which are fixed to the vehicle body member and extend from a lower end of each of the legs in the same direction outwardly in a vehicle width direction, and the connection rod is disposed on an opposite side to at least one of the set of fixed bearing surfaces with respect to the vertical wall.

Accordingly, the connection rod is disposed at least on the opposite side to the fixed bearing surface with respect to the vertical wall, and thus the tensile load detection unit is easily mounted on the mounting portion of the connection rod without interference with other members.

Preferably, the columnar portion includes a pair of flat lateral faces which face each other, the tensile load detection unit includes a pair of clamping units configured to clamp the pair of flat lateral faces therebetween, and a strain gauge provided on each of mutually facing inner faces of the pair of clamping units.

Accordingly, the tensile load detection unit includes the pair of clamping units, and the strain gauges provided on the respective inner surfaces of the pair of clamping units, thereby providing a simple structure and cost effective manufacturing. In addition, the tensile load detection unit can be simply mounted by clamping the pair of flat faces of the columnar portion of the connection rod by the pair of clamping units, and thus the workability of load detection can be improved.

Another aspect of the present disclosure provides a method of manufacturing a parking brake device including a bracket fixed to a vehicle body member, an operating lever rotatably supported on the bracket pivotally, a connection rod connected to a brake cable, and a relay member which relays movement of the operating lever to the brake cable, the method including: providing the connection rod with a mounting portion on which a tensile load detection unit is mounted and with a planar portion which is in sliding contact with the relay member, the tensile load detection unit being configured to detect a tensile load applied to the brake cable; and clamping a cylindrical member having a predetermined length by a set of mutually facing mold members and pressure-molding the planar portion of the connection rod and the mounting portion simultaneously.

According to this aspect, even when the connection rod is further provided with the columnar portion, an increase in the number of processing steps for the connection rod can be avoided due to the simultaneous processing for the planar portion and the columnar portion.

BRIEF DESCRIPTION OF THE DRAWINGS

The advantages of the disclosure will become apparent in the following description taken in conjunction with the following drawings.

DETAILED DESCRIPTION

Figure 1:
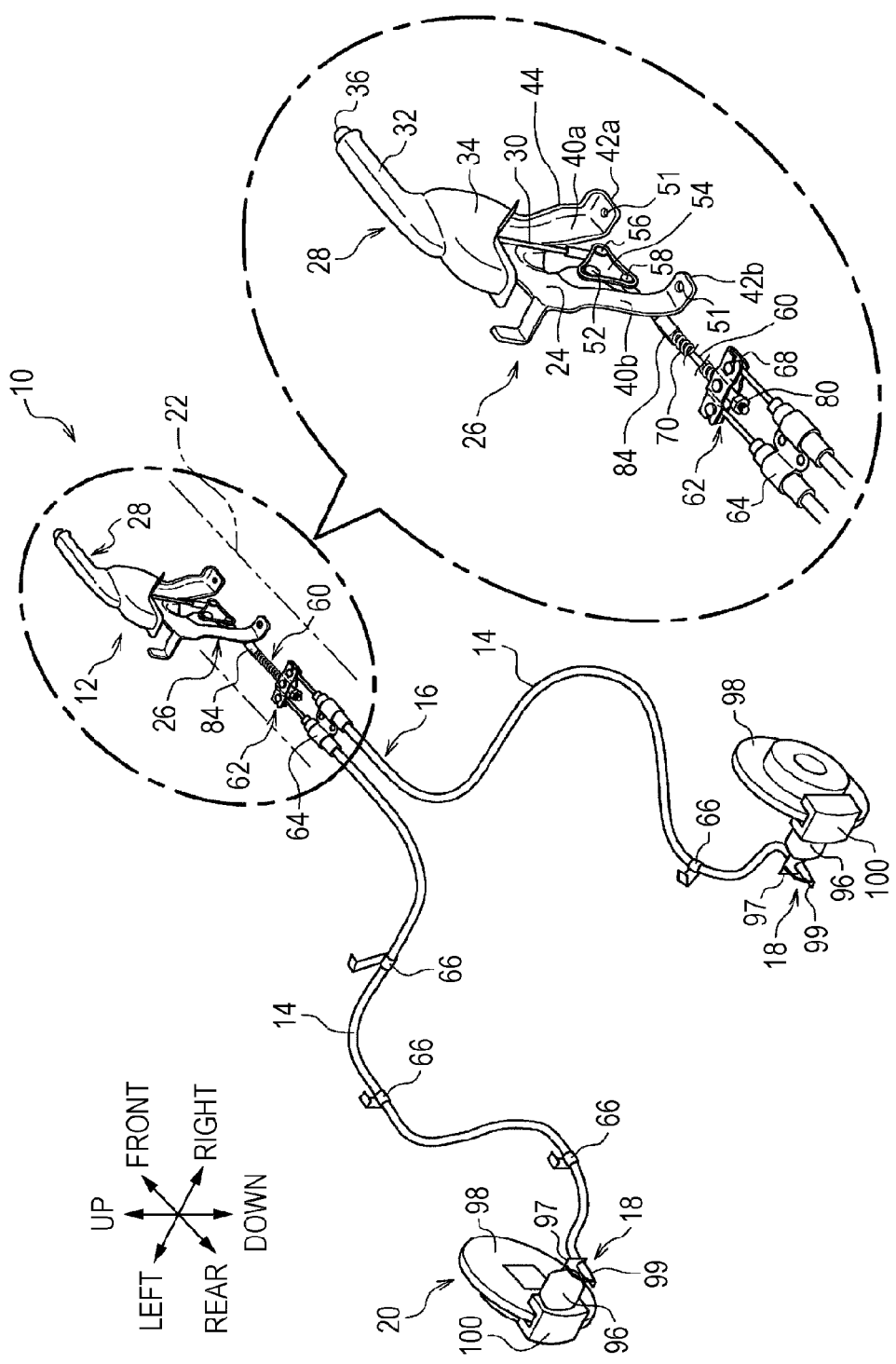
FIG. 1 is a perspective view of the configuration of a parking brake device according to an embodiment of the present disclosure.
Figure 2A:
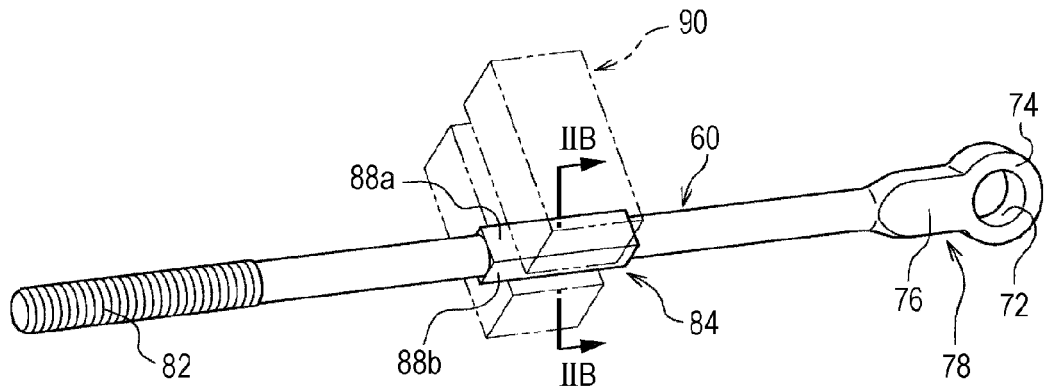
FIG. 2A is a perspective view of a connection rod included in the parking brake device of FIG. 1.
Figure 2B:
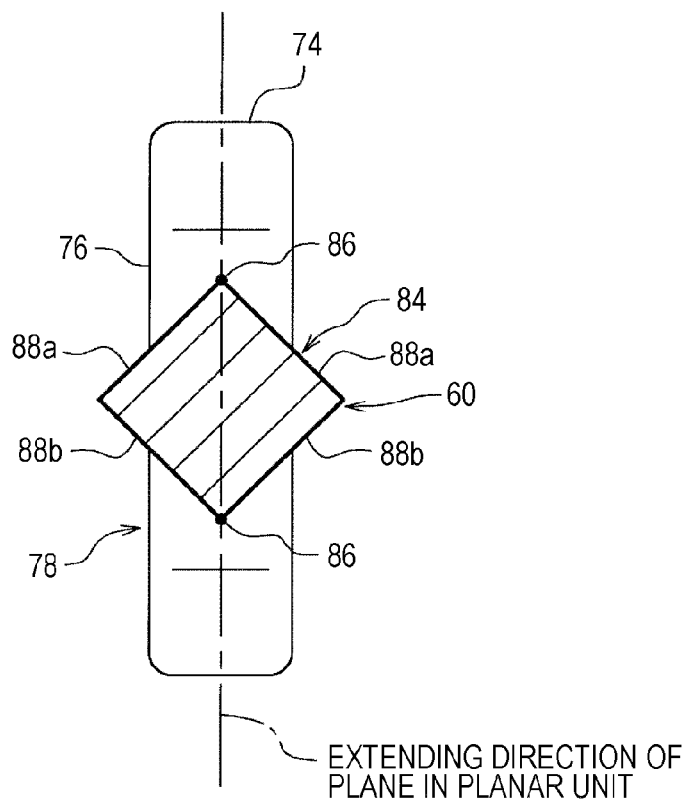
FIG. 2B is a vertical cross-sectional view taken along line IIB-IIB.

In the following, an embodiment of the present disclosure will be described in detail with reference to the drawings as needed. FIG. 1 is a perspective view of the configuration of a parking brake device according to the embodiment of the present disclosure; FIG. 2A is a perspective view of a connection rod included in the parking brake device of FIG. 1; and FIG. 2B is a vertical cross-sectional view taken along line IIB-IIB. It is to be noted that "front and rear", "right and left", and "up and down" in each figure indicate the front and rear directions of a vehicle, width directions of the vehicle (right and left directions), and up and down directions of the vehicle, respectively.

A parking brake device 10 according to the embodiment of the present disclosure, for example, has a function of locking the wheels of the vehicle by a manual operation when the vehicle is parked or stopped. The parking brake device 10 includes, for example, an operation unit 12 which is disposed at a location which is close to the driver's seat and on the top surface of the center console extending in the fore-and-aft direction of the vehicle, an operation force transmission unit 16 configured to transmit a pulling force (operation force) through two brake cables 14, the pulling force being applied via the operation unit 12, and braking units 20 configured to lock the respective rear wheels (not illustrated) by the braking power of respective rear brakes (brake units) 18 which receive the pulling force transmitted through the brake cables 14.

The operation unit 12 includes, for example, a bracket 26 which is fixed to the upper surface of a floor panel (vehicle body member) 22 by a fixing member such as a bolt and has a vertical wall 24 extending in the fore-and-aft direction of the vehicle, a parking brake lever (operating lever) 28 which is disposed over the bracket 26 and rotatably supported by the vertical wall 24 pivotally via a shaft member (not illustrated), and a connection wire 30 having one end which is connected to the parking brake lever 28.

The parking brake lever 28 has a grip 32 for a driver to hold for a braking operation, and a skirt 34 which is formed under the grip 32 integrally with the grip 32. At the end of the grip 32, a lock release button 36 is retractably provided which is pressed by a driver when the rear brakes 18 are released.

The upper portion of the vertical wall 24 of the bracket 26 is provided with a ratchet plate which is not illustrated. On the circular outer circumferential surface of the ratchet plate, a plurality of ratchet teeth (not illustrated) are formed. The parking brake lever 28 is rotatably supported pivotally via a shaft member which is not illustrated. The end of a ratchet pawl (not illustrated) is selectively engaged with one of the ratchet teeth formed on the outer circumferential surface of the ratchet plate.

The lower end of the vertical wall 24 of the bracket 26 is provided with two legs 40a, 40b which are branched off in the fore-and-aft direction of the vehicle. The legs 40a, 40b are respectively provided with a set of fixed bearing surfaces 42a, 42b which extend from the lower end of the legs 40a, 40b in the same direction (the right direction in FIG. 1) along the width of the vehicle and are fixed to the floor panel (vehicle body member) 22.

The lateral edge in a vehicle fore-and-aft direction of the legs 40a, 40b and the bearing surfaces 42a, 42b is provided with a flange 44 which is bent toward the driver's seat. The rigidity and strength of the legs 40a, 40b and the bearing surfaces 42a, 42b are reinforced by the flange 44.

A set of fixed bearing surfaces 42a, 42b is substantially linearly disposed with a predetermined interval in a vehicle fore-and-aft direction. In each fixed bearing surface 42a (42b), a circular insertion hole 51 is formed through which a fixing member such as a bolt is inserted. In FIG. 1, a fixing member to be inserted through the insertion hole 51 of the fixed bearing surfaces 42a, 42b is not illustrated.

A pair of triangular link plates (relay member) 54 is pivotally supported rotatably by a predetermined angle around a pivot pin 52 as a rotation center under the vertical wall 24 between the set of legs 40a and 40b in a vehicle fore-and-aft direction. Each link plate 54 serve as a relay to transmit the movement (displacement) of the parking brake lever 28 to the brake cable 14.

Under the pivot pin 52, a vertex portion of the link plate 54 is connected to the other end of the connection wire 30 via a connection pin 56. Another vertex portion of the link plate 54 facing the above-mentioned vertex portion is connected to one end of a connection rod 60 via a connection pin 58.

The operation force transmission unit 16 includes the connection rod 60 having one end connected to the link plate 54 and the other end connected to the brake cable 14, an equalizer mechanism 62 connected to the other end of the connection rod 60, two brake cables 14 branching off from the equalizer mechanism 62, a fixing bracket 64 for fixing one end of each brake cable 14 to a predetermined position of the floor panel 22, and a plurality of guide members 66 for guiding an extending direction of the brake cable 14.

The connection rod 60 is provided as a cylindrical column and extends in a vehicle fore-and-aft direction. A coil spring 70 is provided externally of the connection rod 60 such that one end of the coil spring 70 is retained by the below-described columnar portion 84, and the other end thereof is retained by the below-described retaining element 68. The coil spring 70 urges the retaining element 68 in a direction in which the retaining element 68 is moved away from the link plate 54 by the spring force.

The connection rod 60 is disposed on the opposite side to at least one of the set of fixed bearing surfaces 42a, 42b with respect to the vertical wall 24. In other words, the connection rod 60 is located on the opposite side to the fixed bearing surface 42b with respect to the leg 40b, the opposite side is the left direction (see the partially enlarged view in FIG. 1), the fixed bearing surface 42b extending from the lower end of the leg 40b in the right direction along the vehicle width.

As illustrated in FIG. 2A, one end of the connection rod 60 in the axial direction is provided with a ring portion 74 which is sandwiched between the pair of link plates 54 and has a through hole 72 through which the connection pin 58 is inserted. A planar portion 78 is provided adjacent to the ring portion 74, the planar portion 78 having planes 76 with an approximately oval side view and being in sliding contact with the inner walls of the pair of link plates 54. The other end of the connection rod 60 is connected to the retaining element 68 via an adjustment nut 80 to be screwed onto a screw portion 82.

The approximately middle of the connection rod 60 is provided with the columnar portion (polygon-shaped columnar portion) 84. As illustrated in FIG. 2B, the columnar portion 84 has a longitudinal cross section perpendicular to the axial direction of the connection rod 60, the longitudinal cross section being a rhombus having diagonal vertices 86 located in the extending direction of the plane 76 of the planar portion 78. The columnar portion 84 is provided with a pair of flat faces 88a, 88b which are formed as flat lateral faces and facing each other. The pair of flat faces 88a, 88b provided in the columnar portion 84 serves as a mounting portion for mounting a tensile load detector (tensile load detection unit) 90 which detects a tensile load applied to the brake cable 14. The tensile load detector 90 will be described in detail below.

The shape of the longitudinal cross section perpendicular to the axial direction of the columnar portion 84 is not limited to the rhombus, and may be a polygon (for example, a quadrilateral, a hexagon, or an octagon) having the diagonal vertices 86 being located in the extending direction of the plane 76 of the planar portion 78.

The equalizer mechanism 62 adjusts the tension balance between the two branching brake cables 14, and has the retaining element 68 which is bent formed having an approximately U-shaped cross section, and an adjustment nut 80 which is screwed onto the screw portion 82 of the connection rod 60 to adjust the tensile force of the connection rod 60 by increasing or decreasing the amount of screwing with respect to the screw portion 82. In the retaining element 68, there is formed a through hole into which a cylindrical fitting portion of the brake cable 14 is inserted and fitted.

Each brake cable 14 includes an inner cable formed of a thin iron wire, an outer cable which is flexibly provided as a tubular body to cover the internal inner cable, and a coating member which is made of, for example, polyethylene coating and covers the outer cable, the tubular body being obtained by winding a thin belt-like object.

One end of the outer cable near the rear brakes 18 is disposed at a fixing member 97 (see FIG. 1) which is fixed to the below-described cable connecting unit 96 (see FIG. 1). One end of the inner cable near the rear brakes 18 is disposed at the end face of a clamping member 99 (see FIG. 1) which clamps the end of the inner cable. The other end of the outer cable closer to the operation unit 12 is provided in an area of the fixing bracket 64, and the other end of the inner cable is provided at the cylindrical fitting portion which is inserted and fitted into the through hole of the retaining element 68 (see FIG. 1).

As illustrated in FIG. 1, each of the rear brakes 18 includes the cable connecting unit 96 to which the other end of the brake cable 14 is connected, a disc 98 which is fixed to a wheel (not illustrated) and rotates with the wheel, and a pad unit 100 having a pad (not illustrated) to press the disc 98.

Figure 3:
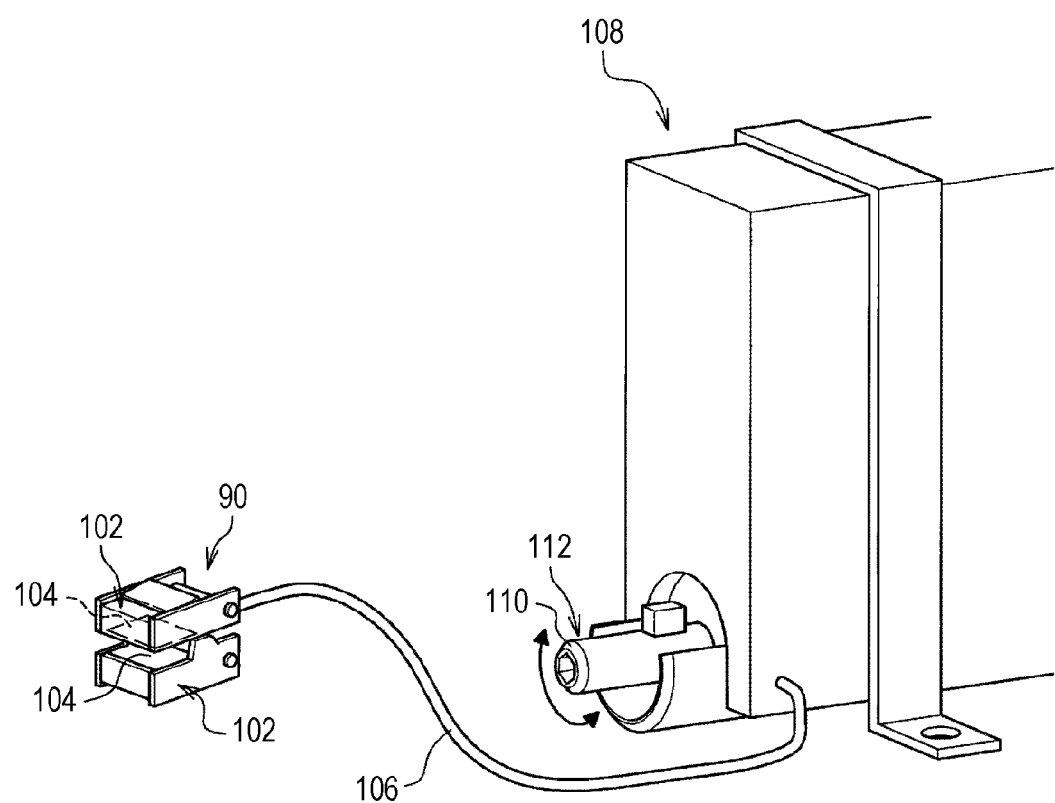
FIG. 3 is a schematic perspective view of a tensile load detector and a load adjustment device.
Figure 4:
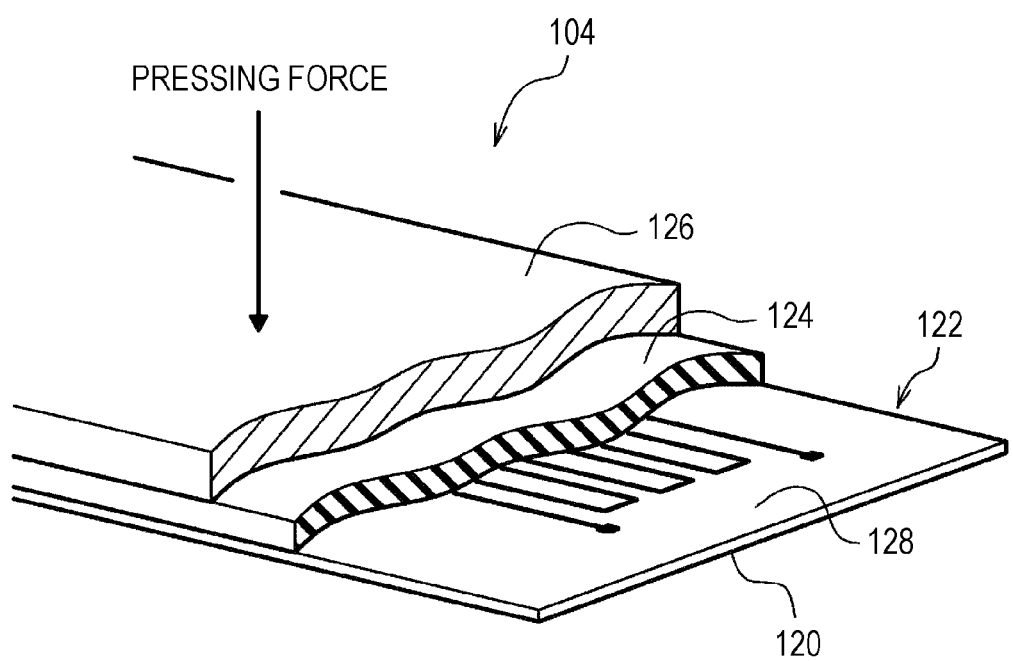
FIG. 4 is a partially cutaway schematic configuration view of a strain gauge.
Figure 5:
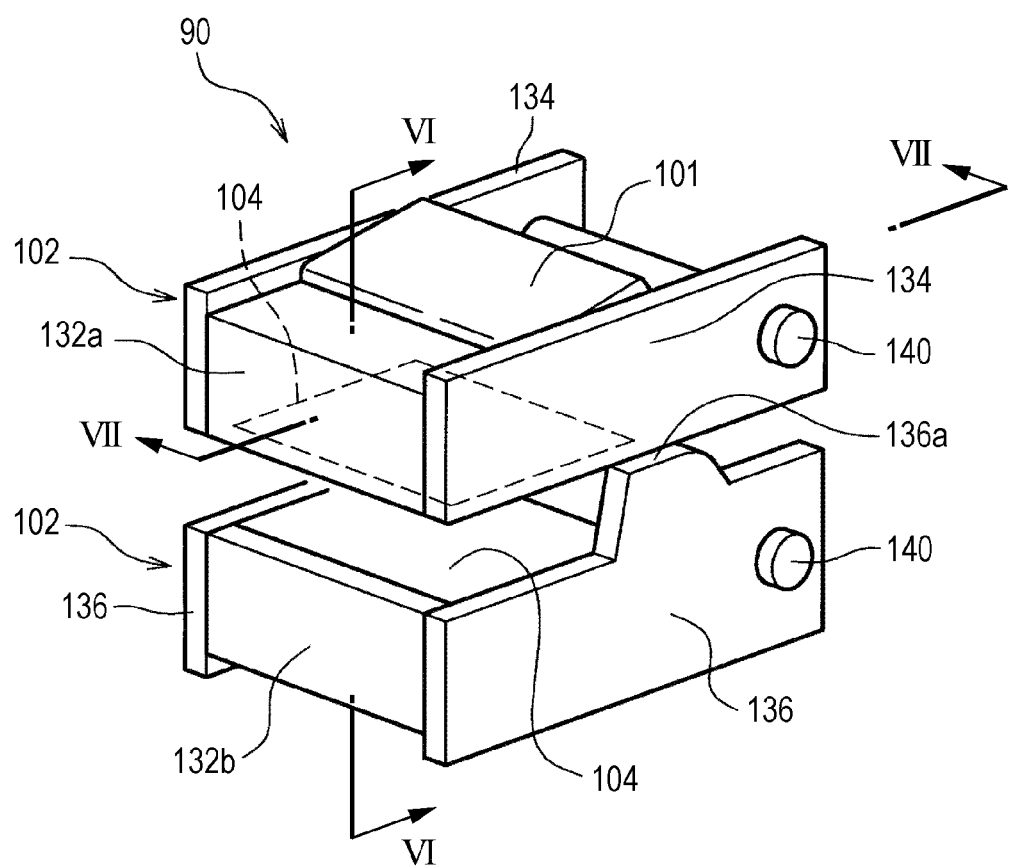
FIG. 5 is an enlarged perspective view of the tensile load detector illustrated in FIG. 3.
Figure 6:
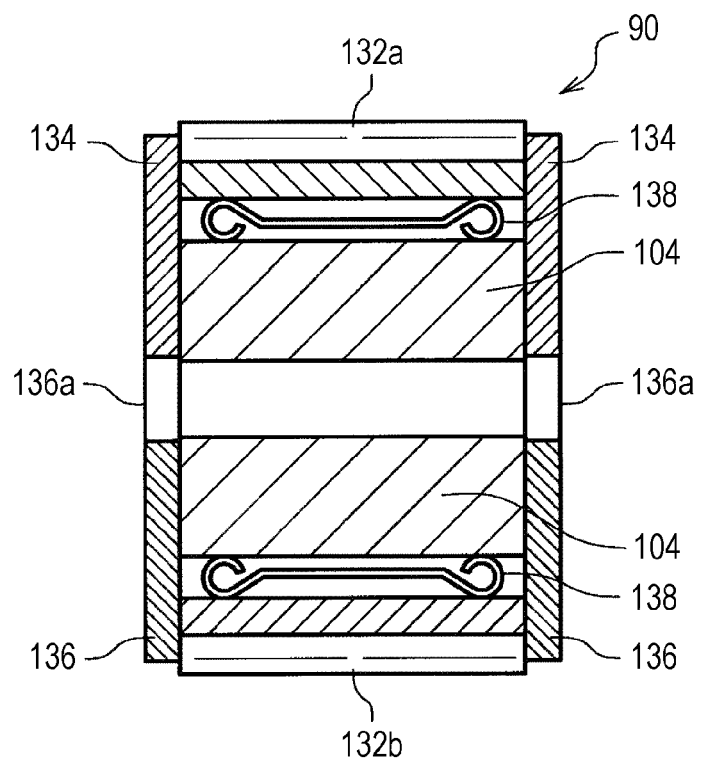
FIG. 6 is a vertical cross-sectional view taken along line VI-VI of FIG. 5.
Figure 7:
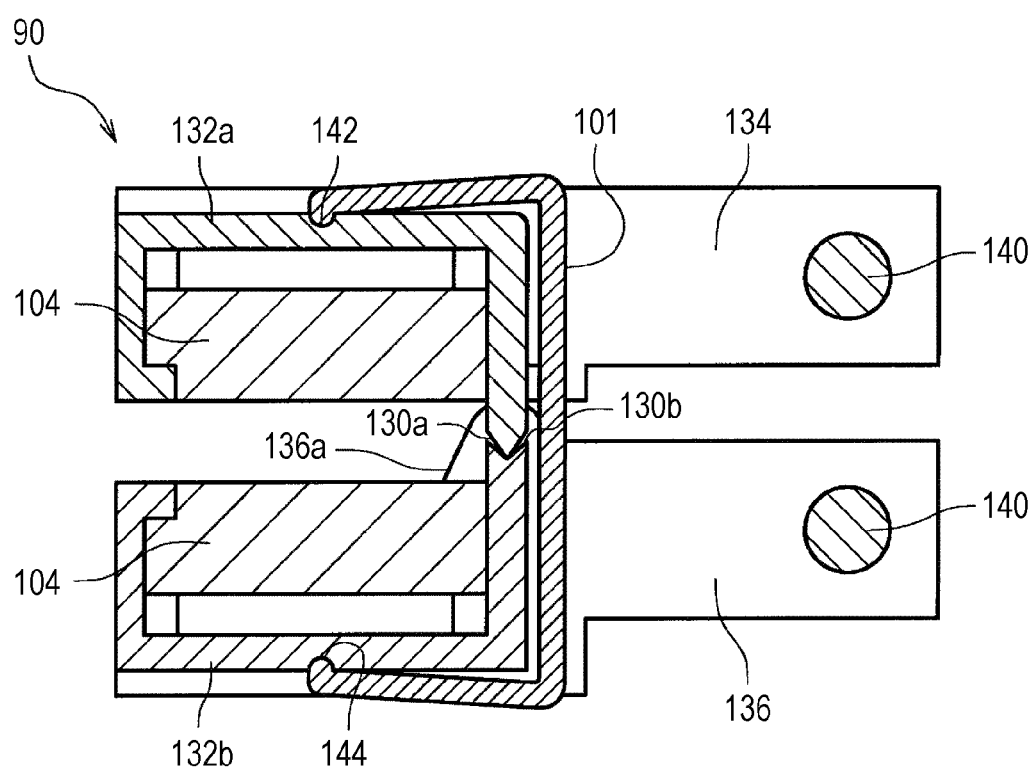
FIG. 7 is a vertical cross-sectional view taken along line VII-VII of FIG. 5.

FIG. 3 is a schematic perspective view of a tensile load detector and a load adjustment device; FIG. 4 is a partially cutaway schematic configuration view of a strain gauge; FIG. 5 is an enlarged perspective view of the tensile load detector illustrated in FIG. 3; FIG. 6 is a vertical cross-sectional view taken along line VI-VI of FIG. 5; and FIG. 7 is a vertical cross-sectional view taken along line VII-VII of FIG. 5.

As illustrated in FIG. 3, the tensile load detector 90 is, for example, clothespin-shaped, and has a pair of clamping units 102 to clamp a pair of facing flat faces 88a, 88b of the columnar portion 84 by the spring force of the below-described plate spring member 101. A strain gauge 104 is provided on each of the facing inner surfaces of the pair of clamping units 102.

In the present embodiment, the tensile load detector 90 includes the pair of clamping units 102, and the strain gauges 104 provided on the respective inner surfaces of the pair of clamping units 102, thereby providing a simple structure and cost effective manufacturing. In addition, the tensile load detector 90 can be simply mounted by clamping the pair of flat faces 88a, 88b of the columnar portion 84 of the connection rod 60 by the pair of clamping units 102, and thus the workability of load detection can be improved.

As illustrated in FIG. 3, the tensile load detector 90 is electrically connected to a load adjustment device 108 via a lead 106. The load adjustment device 108 includes a nut mounting unit 112 having a shaft 110 with a hole in which the adjustment nut 80 is installed in the below-described adjustment work of the tensile load of the brake cable 14; a rotation mechanism (not illustrated) configured to adjust the amount of screwing of the adjustment nut 80 with respect to the screw portion 82 of the connection rod 60 by driving a rotation driving source to cause the shaft 110 to rotate normally or reversely; and a display unit (not illustrated) configured to display, for example, a digital signal which has been converted from a detection signal corresponding to a tensile load detected by the tensile load detector 90.

As illustrated in FIG. 4, the strain gauge 104 includes a plate-like detection body 122 having a measuring surface 120 at the bottom, a flexible rubber layer 124 stacked on the upper surface of the detection body 122, and a metal plate 126 stacked on the upper surface of the flexible rubber layer 124. The measuring surface 120 of the detection body 122 is preferably coated with emery powder which is not illustrated.

The general principle of operation of the strain gauge 104 for detecting strain will be described below. When a pressing force is applied to the metal plate 126 by a pressing force application unit (not illustrated) in the direction of the arrow, the pressing load is transmitted to the entire detection body 122 via the flexible rubber layer 124. When the pressing load is transmitted to the detection body 122, friction occurs between the measuring surface 120 at the bottom of the detection body 122 and a measuring target surface 128 which is the upper surface of the detection body 122 to which the pressing load is transmitted via the flexible rubber layer 124. When the friction causes strain to occur in the measuring target surface 128 which is the upper surface of the detection body 122, the flexible rubber layer 124 having a low elastic coefficient does not prevent the detecting body 122 from following the measuring target surface 128 (upper surface) where strain has occurred, and thus strain can be detected by the detection body 122.

As illustrated in FIGS. 5 to 7, a pair of clamping units 102 includes an upper case 132a and a lower case 132b which are provided to be openable and closable by a predetermined angle with respect to an engagement portion (see FIG. 7) between V-shaped cross sectional projecting portion 130a and V-shaped cross sectional depressed portion 130a, a pair of strain gauges 104 held in the inside bottom surface of the upper case 132a and in the ceiling surface of the lower case 132b, a pair of upper arm plates 134 facing each other and fixed to respective lateral surfaces of the upper case 132a, and a pair of lower arm plates 136 facing each other and fixed to respective lateral surfaces of the lower case 132b.

The pair of clamping units 102 further includes a U-shaped cross-sectional plate spring member 101 which applies a load (spring force) to the upper case 132a and the lower case 132b (the pair of clamping units 102) in a closing direction; a pair of plate springs 138 which is interposed between one of the strain gauges 104 and the upper case 132a and between the other of the strain gauges 104 and the lower case 132b to press the strain gauges 104 toward the measuring surface 120; and gripping units 140 which are provided between the pair of upper arm plates 134 and between the pair of lower arm plates 136, respectively. The pair of lower arm plates 136 is provided with projection pieces 136a which project toward the upper arm plates 134, and each serve as a supporting point when a worker grips the gripping units 140 to open a pair of clamping units 102 for a predetermined angle.

As illustrated in FIG. 7, the plate spring member 101 has curved cross-sectional engaging projections 144 which are engaged with long grooves 142 respectively formed in the upper case 132a and the lower case 132b. The engaging projections 144 is able to apply a load (spring force) to the upper case 132a and the lower case 132b (the pair of clamping units 102) in a closing direction.

Figure 8:
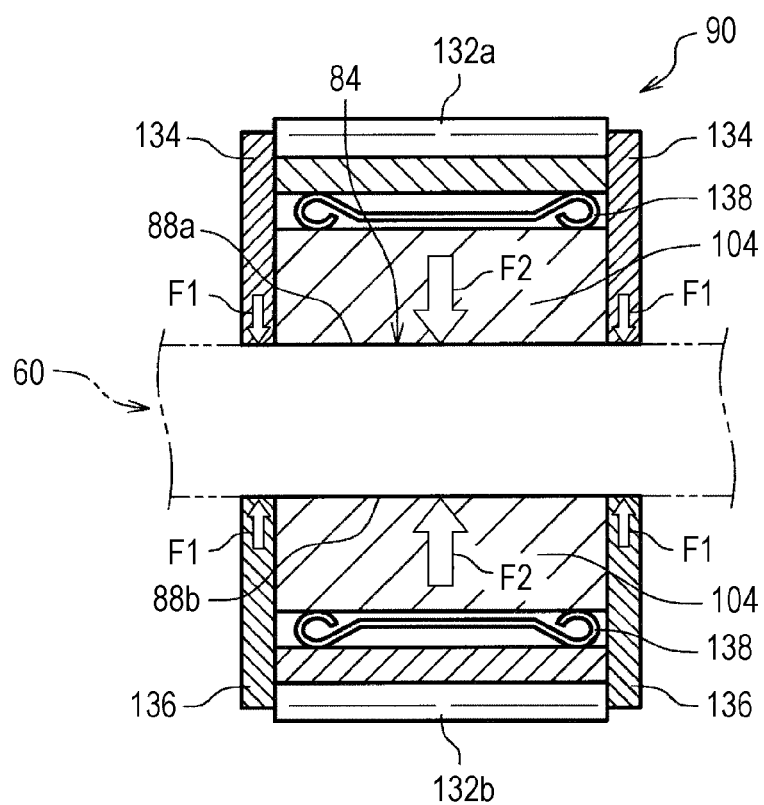
FIG. 8 is a vertical cross-sectional view of the manner in which a columnar portion of a connection rod is pinched by a pair of clamping units of the tensile load detector.

FIG. 8 is a vertical cross-sectional view of the manner in which a columnar portion of a connection rod is pinched by a pair of clamping units of the tensile load detector.

When a worker grips the gripping units 140 to open a pair of clamping units 102 for a predetermined angle, and holds the columnar portion 84 (the flat faces 88a and 88b) of the connection rod 60, a force F1 is applied to the pair of clamping units 102 in a closing direction by the spring force of the plate spring member 101 as illustrated in FIG. 8, and the plate springs 138 causes the strain gauges 104 to press the measuring surface 120 with force F2. Due to the force F1 and force F2, strain (tensile load) of the columnar portion 84 of the connection rod 60 can be suitably detected by the pair of strain gauges 104.

The parking brake device 10 according to present embodiment basically has the configuration as described above, and the operation and operational effect thereof will be described in the following.

After a vehicle is stopped or parked, a driver grips and pulls up the grip 32 of the parking brake lever 28 so as to cause the parking brake lever 28 to rotate upward around a supporting shaft (not illustrated) as the center of rotation. Along with the rotation operation, the connection rod 60 connected to the parking brake lever 28, the equalizer mechanism 62, and the inner cable are pulled via the link plate 54, and thus the rear brake 18 is operated and the rear wheels are locked.

When the driver releases the grip 32 after rotating the parking brake lever 28 around the supporting shaft (not illustrated) for the predetermined angle, the end of the ratchet pawl (not illustrated) is engaged with one of the ratchet teeth of the ratchet plate, and the parking brake lever 28 is held in the engaged position.

Figure 9A:
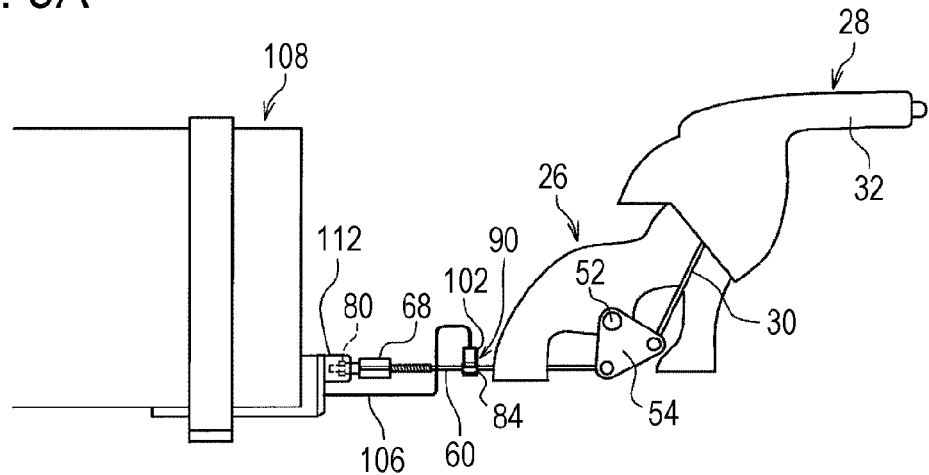
FIGS. 9A to 9C are side views sequentially illustrating the steps of adjusting the tensile load of a brake cable.
Figure 9B:
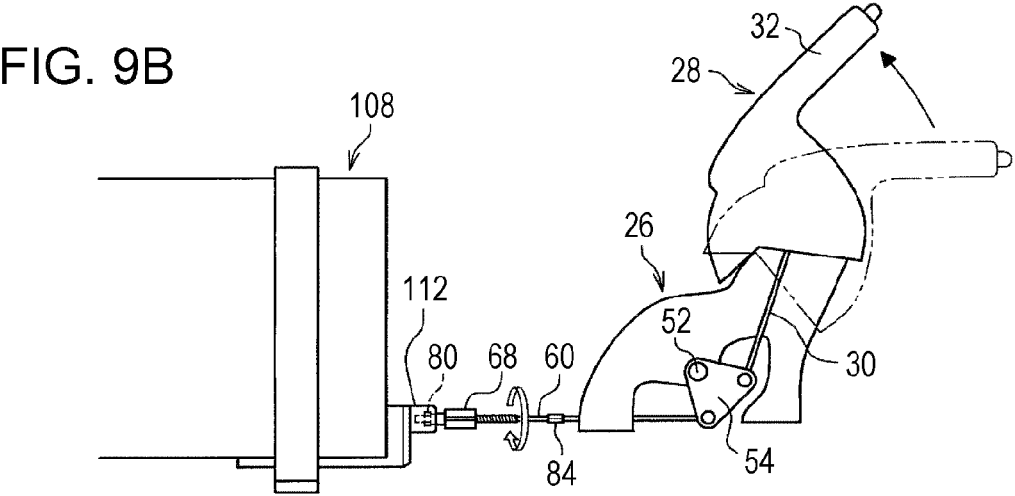
Figure 9C:
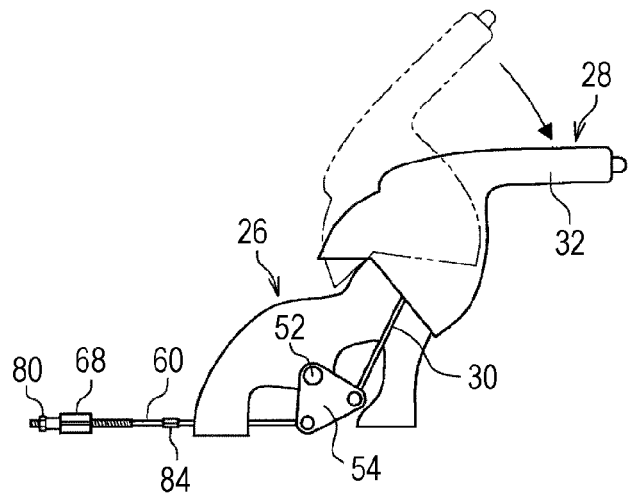

Next, a method of detecting the tensile load of the brake cable 14 and adjusting the tensile load to a predetermined value will be described in the following. FIGS. 9A to 9C are side views sequentially illustrating the steps of adjusting the tensile load of the brake cable.

As illustrated in FIG. 9A, before the parking brake lever 28 is pulled by a worker, the columnar portion 84 near the center of the connection rod 60 is clamped by the pair of clamping units 102 of the tensile load detector 90, and the tensile load of the brake cable 14 applied to the connection rod 60 is measured. In this case, the strain gauges 104 (see FIG. 3) provided on the facing inner walls (contact surfaces with the columnar portion 84) of the pair of clamping units 102 come in contact with a pair of facing flat faces 88a, 88b (see FIG. 2A) of the columnar portion 84 (see FIG. 8).

A tensile load detected by the tensile load detector 90 is displayed on a display unit (not illustrated) of the load adjustment device 108 which is electrically connected to the tensile load detector 90 via the lead 106. A worker visually recognizes the display unit of the load adjustment device 108 and determines whether or not the tensile load of the brake cable 14 has fallen below a predetermined value. When the tensile load has fallen below the predetermined value, the following adjustment work is done.

Subsequently, the grip 32 of the parking brake lever 28 is gripped and pulled up (see the two-dot chain line of FIG. 9A), then a rotation mechanism (not illustrated) of the load adjustment device 108 is driven to rotate the shaft 110 of the nut mounting unit 112 in a predetermined direction. The rotation of the shaft 110 tightens the adjustment nut 80 installed in the hole of the shaft 110, and the tensile load is set to a predetermined value or higher. The adjustment nut 80 may be manually tightened by a worker using a tool (not illustrated) without using the load adjustment device 108.

In this manner, the tensile load can be set to a predetermined value by increasing or decreasing the degree of tightening of the adjustment nut 80. Lastly, the lock release button 36 is pressed to release the lock of the parking brake lever 28 to allow the parking brake lever 28 to return to an initial position, and adjustment work is completed.

In the present embodiment, the tensile load applied to the connection rod 60 is suitably detected by providing the connection rod 60 with the mounting portion (the flat faces 88a, 88b of the columnar portion 84) on which the tensile load detector 90 is mounted, the connection rod 60 being directly connected to the brake cable 14. For this reason, in the present embodiment, the accuracy in detecting the tensile load, which is applied to the brake cable 14, can be improved, and the tensile load of the brake cable 14 can be adjusted accurately.

By the way, in general, in order to detect a tensile load accurately, the tensile load detector 90 is preferably installed on a flat surface. For example, when a tensile load is detected with the connection rod 60 clamped by the tensile load detector 90, the detection portion of the connection rod 60 preferably has at least two facing flat faces 88a, 88b. When the two flat faces 88a, 88b are formed in the connection rod 60, the cylindrical connection rod 60 is pressure-molded by press work. However, when a pressing direction is set to be a different direction from the pressing direction of the press work for the planar portion 78, the press work being originally necessary for mounting to the link plate 54, the number of processing steps is increased and the manufacturing process becomes complicated like the below-described comparative example. In order to form the flat faces 88a, 88b by press work, it is necessary to consider that forming flat faces 88a, 88b is difficult because burrs occur on the mating portions of the press mold.

Thus, in the present embodiment, a cross section of the columnar portion 84 perpendicular to its axial direction is a rhombus which has diagonal vertices 86 (see FIG. 2B) and is located in the extending direction of the plane 76 of the planar portion 78, and so the flat faces 88a, 88b as the mounting portion of the columnar portion 84 can be molded simultaneously with the press work for providing the planar portion 78 which is in sliding contact with the link plate 54. In addition, in the present embodiment, the below-described mating portions of a set of mold members 120a, 120b (see FIG. 10B) can include vertices 86 of a cross section rhombus (cross section quadrilateral), and thus the facing flat faces 88a, 88b can be simply molded, and it is possible to provide the mounting portion (the flat faces 88a, 88b of the columnar portion 84) which allows the accuracy of detection of a tensile load to be improved, by easy processing.

Furthermore, the tensile load of the connection rod 60 is usually detected with the parking brake device 10 incorporated in the vehicle body, and the connection rod 60 is surrounded by bracket 26 and the floor panel 22. Therefore, the tensile load detector 90 is preferably mounted on the mounting portion of the connection rod 60 in a vehicle width direction.

Then, in the present embodiment, a cross section of the columnar portion 84 perpendicular to its axial direction is a rhombus which has diagonal vertices 86 (see FIG. 2B) located in the extending direction of the plane 76 of the planar portion 78, and thus for example, even in the case where the tensile load detector 90 includes a set of clamping units 102 equipped with the strain gauge 104, the flat faces 88a, 88b included in the mounting portion can be set with an angle including a vehicle width direction component. If the flat faces 88a, 88b included in the mounting portion are set in a vehicle vertical direction the clamping units 102 of the tensile load detector 90 need to be mounted in a vehicle vertical direction, and a problem arises in that the clamping units 102 interfere with other members. In the present embodiment, the above-mentioned increase in the number of processing steps and interference with other members may be avoided so that both advantages may be combined (achieved).

In addition, in the present embodiment, the connection rod 60 is disposed on the opposite side to the fixed bearing surface 42b with respect to the vertical wall 24, and thus the tensile load detector 90 is easily mounted on the mounting portion (the flat faces 88a, 88b of the columnar portion 84) of the connection rod 60 without interference with other members (see the partially enlarged perspective view in FIG. 1).

Figure 10A:
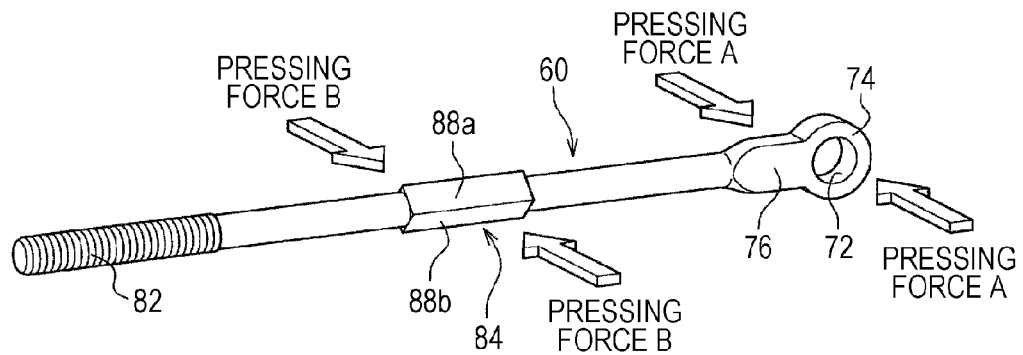
FIG. 10A is a perspective view illustrating the directions of pressing force applied to the connection rod according to the present embodiment.
Figure 10B:
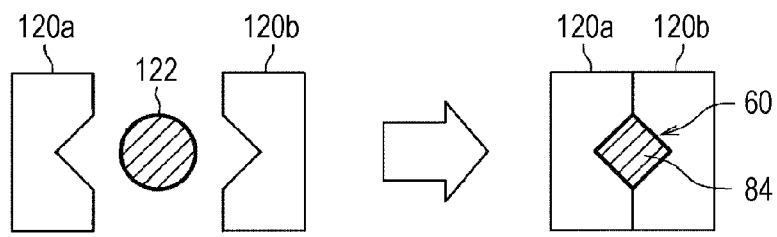
FIG. 10B is a schematic diagram illustrating a method of manufacturing the connection rod according to the present embodiment.
Figure 10C:
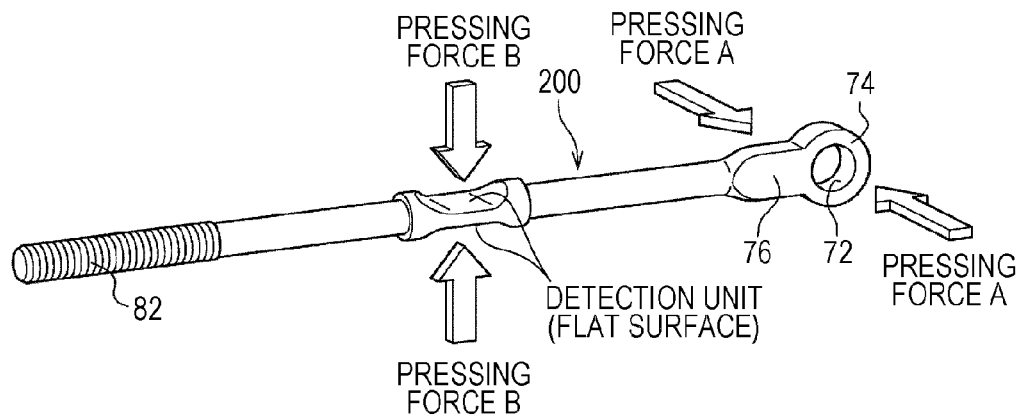
FIG. 10C is a perspective view illustrating the directions of pressing force applied to a connection rod according to a comparative example.

Next, a method of manufacturing the connection rod 60 will be described in the following. FIG. 10A is a perspective view illustrating the directions of pressing force applied to the connection rod according to the present embodiment, FIG. 10B is a schematic diagram illustrating a method of manufacturing the connection rod according to the present embodiment, and FIG. 10C is a perspective view illustrating the directions of pressing force applied to a connection rod according to a comparative example. In the connection rod 200 according to the comparative example illustrated in FIG. 10C, the same components as those in the connection rod 60 according to the present embodiment illustrated in FIG. 10A are labeled with the same reference symbols.

As illustrated in FIG. 10B, a cylindrical member (billet) 122 having a predetermined length is clamped by a set of mutually facing mold members 120a, 120b, pressing force A and pressing force B are simultaneously applied to the cylindrical member 122 in the directions of arrows in FIG. 10A, and the plane 76 of the planar portion 78 of the connection rod 60 and the flat faces 88a, 88b of the columnar portion 84 are thereby pressure-molded simultaneously or almost simultaneously.

In the present embodiment, the pressing direction for the plane 76 of the planar portion 78 of the connection rod 60, and the pressing direction for the flat faces 88a, 88b of the columnar portion 84 are set to the same direction, and thus the planar portion 78 and the columnar portion 84 can be simultaneously molded by a single pressing process (one press). As a result, in the present embodiment, even when the connection rod 60 is further provided with the columnar portion 84, an increase in the number of processing steps for the connection rod 60 can be avoided due to the simultaneous processing for the planar portion 78 and the columnar portion 84.

In the present embodiment, all the lateral faces of the columnar portion 84 each with a rhombus cross-section can be formed by the press-molding surfaces of the pair of mold members 120a, 120b, and thus the cross-sectional area of the columnar portion 84 can be made uniform and manufacturing error can be reduced even for mass production.

Furthermore, in the present embodiment, by using a rhombus cross-section for the columnar portion 84, for example, it is possible to reduce an error (variation) when the amount of strain detected by the strain gauge 104 is converted to a tensile load, and thus the accuracy in detecting the tensile load can be further improved.

On the other hand, in the connection rod 200 according to the comparative example illustrated in FIG. 10C, the pressing force A for pressure-molding the plane of the planar portion 78 of the connection rod 60, and the pressing force B for pressure-molding the flat faces of the detection portion are set to have different directions (the pressing force A and the pressing force B are perpendicular in FIG. 10C). For this reason, in the comparative example, it is difficult to simultaneously or almost simultaneously pressure-mold the plane 76 of the planar portion 78 of the connection rod 200 and the flat faces of the detection portion, and pressing forces are applied separately, thereby increasing the number of processing steps.

Figure 11:
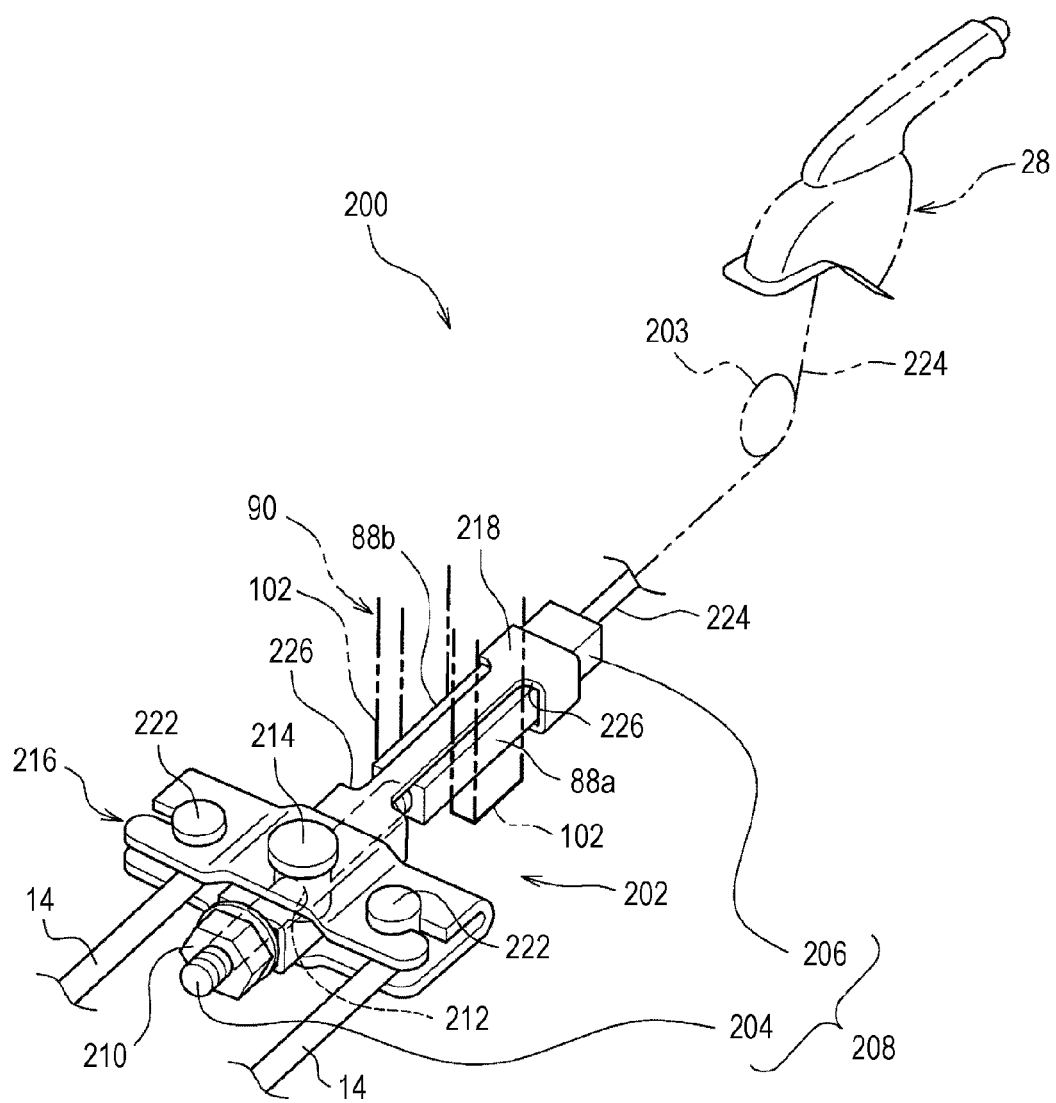
FIG. 11 is a schematic perspective view of a parking brake device according to another embodiment of the present disclosure.

In the following, a parking brake device 200 according to another embodiment of the present disclosure will be described. The same components as those in the parking brake device 10 illustrated in FIG. 1 are labeled with the same reference symbols, and detailed description thereof is omitted. FIG. 11 is a schematic perspective view of a parking brake device according to another embodiment of the present disclosure. The parking brake device 200 illustrated in FIG. 11 differs from the parking brake device in the above-described embodiment in that the link plate 54 and the connection rod 60 are not provided.

The parking brake device 200 includes an equalizing mechanism (equalizer) 202 that uniformly distributes the operation force of the parking brake lever 28 to the pair of brake cables 14. A guide member 203 is disposed between the parking brake device 200 and the equalizing mechanism 202, and the operation force of the parking brake lever 28 is transmitted to the equalizing mechanism 202 through the guide member 203.

The equalizing mechanism 202 is provided at the end of the brake cables 14, and includes a cable end 208 having a screw portion 204 and a columnar portion 206; a cable adjustment nut 210 to be screwed onto the screw portion 204; a fitting pin 214 having a through hole 212 through which the screw portion 204 inserted; a retaining element 216 rotatably supporting the fitting pin 214 pivotally; a collar 218 which is in surface contact with the columnar portion 206 and fixed to the fitting pin 216. In FIG. 11, a configuration is adopted in which the collar 218 is fixed to the retaining element 216 by the fitting pin 214. However, the collar 218 may be directly fixed (bonded) to the retaining element 216, for example, by welding or the like.

In a state where the screw portion 204 is inserted in the through hole 212 of the fitting pin 214, the length (tension) of the pair of brake cables 14 can be adjusted by adjusting the screw position of the cable adjustment nut 210 with respect to the screw portion 204.

The retaining element 216 is formed by bending a planar plate into substantially U-shape. The ends of the pair of brake cables 14 are each connected a cylindrical fitting portion 222.

The collar 218 has a function of preventing axial rotation around a front cable 224 connected to the parking brake lever 28, and portions of the collar 218 which are in surface contact with the columnar portion 206 are each provided with a notch 226. By providing the collar 218 with the notch 226, the mutually facing flat faces (flat lateral faces) 88a, 88b of the columnar portion 206 are exposed to the outside. The pair of flat faces 88a, 88b provided on the columnar portion 206 serves as the mounting portion for mounting the tensile load detector 90 which detects a tensile load applied to the brake cables 14.

That is, by clamping (see the two-dot chain line of FIG. 11) the pair of flat faces 88a, 88b of the columnar portion 206 with the pair of clamping units 102, the tensile load detector 90 can be easily mounted and the workability of the load detection can be improved, the pair of flat faces 88a, 88b being provided at the cable end 208 of the equalizing mechanism 202. In FIG. 11, only a portion of the tensile load detector 90 is illustrated for the sake of simplicity.

In this manner, in the parking brake device 200 according to another embodiment, even in the case where the link plate 54 and the connection rod 60 are not provided, with the above-described configuration of the equalizing mechanism 202, the pair of flat faces (mounting portion) 88a, 88b for detecting a tensile load can be provided irrespective of the configuration of the parking brake lever 28 and the bracket 26.

Other operational effects are the same as those of the parking brake device 10 according to the embodiment illustrated in FIG. 1, and thus detailed description thereof is omitted. The present invention may be embodied in other specific forms without departing from its spirit or essential characteristics. The described embodiments are to be considered in all respects only as illustrative and not restrictive. The scope of the invention is, therefore, indicated by the accompanied claims rather than by the foregoing description. All changes which come within the meaning and range of equivalency of the claims are to be embraced within their scope.

We claim:
1. A parking brake device comprising:
a bracket fixed to a vehicle body member;
an equalizer;
a plurality of brake cables; and
a operating lever pivotally and rotatably supported by the bracket such that raising or lowering the operating lever causes an operating force of the operating lever to be transmitted individually to a plurality of wheel brakes as a braking operation force via the equalizer and the plurality of brake cables;
a tensile load detection unit;
a mounting portion on which the tensile load detection unit is mounted such that a tensile load applied to the brake cables is detected by the tensile load detection unit, wherein the mounting portion is disposed between the equalizer and the bracket; and
a columnar portion having a flat lateral face and a screw portion connected to the columnar portion,
wherein the mounting portion is the flat lateral face of the columnar portion,
wherein the equalizer is provided at ends of the brake cables, and includes:
a cable adjustment nut to be screwed onto the screw portion;
a fitting pin having a through hole in which the screw portion is inserted;
a retaining element configured to rotatably support the fitting pin.
2. The parking brake device according to claim 1,
wherein the columnar portion includes a pair of the flat lateral faces which face each other,
the tensile load detection unit includes
a pair of clamping units configured to clamp the pair of flat lateral faces therebetween, and a strain gauge provided on each of mutually facing inner faces of the pair of clamping units.
3. The parking brake device according to claim 1, wherein the mounting portion is linked to the operating lever at one end and connected to the equalizer at the other end.
4. A parking brake device comprising:
a bracket fixed to a vehicle body member;
an equalizer;
a plurality of brake cables; and
a operating lever pivotally and rotatably supported by the bracket such that raising or lowering the operating lever causes an operating force of the operating lever to be transmitted individually to a plurality of wheel brakes as a braking operation force via the equalizer and the plurality of brake cables;
a tensile load detection unit;
a mounting portion on which the tensile load detection unit is mounted such that a tensile load applied to the brake cables is detected by the tensile load detection unit, wherein the mounting portion is disposed between the equalizer and the bracket; and
a connection rod disposed in the bracket, the connection rod having one end and the other end, the one end being connected to the operating lever or a relay member which relays movement of the operating lever to the brake cable, the other end being connected to the brake cable,
wherein the mounting portion is provided in the connection rod,
wherein the connection rod is provided in a cylindrical shape,
one end of the connection rod includes a planar portion which is in sliding contact with the relay member or the operating lever,
an approximately center portion of the connection rod is provided with a columnar portion,
a cross section of the columnar portion perpendicular to an axial direction of the connection rod is a polygonal shape which has a flat lateral face and diagonal vertices located in an extending direction of a plane of the planar portion, and
the mounting portion is the flat lateral face of the columnar portion.
5. The parking brake device according to claim 4,
wherein a pair of the diagonal vertices of the polygonal shape are located parallel to an extending direction of a plane of the planar portion.
6. A parking brake device comprising:
a bracket fixed to a vehicle body member;
an equalizer;
a plurality of brake cables; and
a operating lever pivotally and rotatably supported by the bracket such that raising or lowering the operating lever causes an operating force of the operating lever to be transmitted individually to a plurality of wheel brakes as a braking operation force via the equalizer and the plurality of brake cables;
a tensile load detection unit;
a mounting portion on which the tensile load detection unit is mounted such that a tensile load applied to the brake cables is detected by the tensile load detection unit, wherein the mounting portion is disposed between the equalizer and the bracket; and
a connection rod disposed in the bracket, the connection rod having one end and the other end, the one end being connected to the operating lever or a relay member which relays movement of the operating lever to the brake cable, the other end being connected to the brake cable,
wherein the mounting portion is provided in the connection rod,
wherein the bracket includes:
a vertical wall which extends in a fore-and-aft direction of a vehicle and is configured to pivotally and rotatably support the operating lever,
a plurality of legs provided at a front portion and a rear portion of the vertical wall, and
a plurality of fixed bearing surfaces, each extending from a lower end of corresponding one of the legs in a vehicle width direction and fixed to the vehicle body member, and
wherein the connection rod is disposed on an opposite side to at least one of the fixed bearing surfaces with respect to the vertical wall.
7. A parking brake device comprising:
a bracket fixed to a vehicle body member;
a plurality of brake cables;
an equalizer connected to the brake cables;
a operating lever pivotally and rotatably supported by the bracket;
a elongated member having one longitudinal end linked to the operating lever and an opposite longitudinal end connected to the equalizer; and
a tensile load detector;
wherein the elongated member includes a mounting portion on which the tensile load detector is mounted such that a tensile load applied to the brake cables is detected by the tensile load detector, wherein the mounting portion is disposed between the equalizer and the bracket, wherein the parking brake device further comprises a columnar portion having a flat lateral face and a screw portion connected to the columnar portion, wherein the mounting portion is the flat lateral face of the columnar portion, wherein the equalizer is provided at ends of the brake cables, and includes:

a cable adjustment nut to be screwed onto the screw portion;

a fitting pin having a through hole in which the screw portion is inserted;

a retaining element configured to rotatably support the fitting pin.

* * * * *